May 13, 1941.  L. S. WILLIAMS  2,241,690
MAGNIFYING MEASURING INSTRUMENT
Filed Sept. 29, 1939
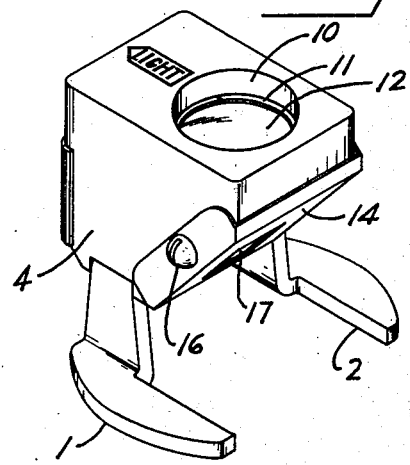
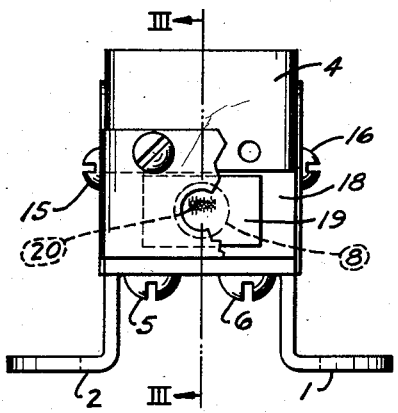
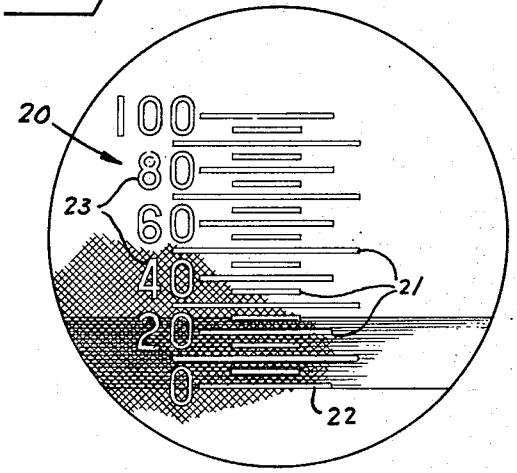
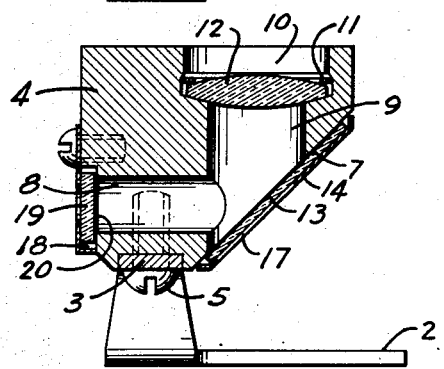
Lawrence S. Williams
INVENTOR
BY Marshall & Marshall
ATTORNEYS Patented May 13, 1941

2,241,690

UNITED STATES PATENT OFFICE 2,241,690

MAGNIFYING MEASURING INSTRUMENT

Lawrence S. Williams, Toledo, Ohio, assignor to Toledo Scale Company, a corporation of New Jersey Application September 29, 1939, Serial No. 297,132

5 Claims. (Cl. 88—2.3)

This invention relates to magnifying measuring instruments.

One of the purposes of the invention is to provide means by which an object to be measured and a brilliant scale are made to appear together and at the same distance, and are magnified to the same extent.

Another purpose of the invention is to provide a device for causing an object to be measured and a scale to be brightly visible together by ordinary natural light or artificial room light.

Another purpose is the provision of an instrument by means of which an object to be measured can be viewed in unobscured detail in conjunction with a measuring scale.

Another purpose is the provision of an instrument by means of which an uninverted magnified object to be measured and a reflected scale may be viewed together.

Still another purpose is the provision of an instrument by means of which a magnified virtual image of an object and a magnified virtual image of a measuring scale may be viewed together without parallax; and, A further purpose is to provide a magnifying measuring device which is inexpensive, compact, and easy to use.

Other objects and advantages will be apparent from the following description, in which reference is had to the accompanying drawing illustrating a preferred embodiment of the invention and wherein similar reference numerals designate similar parts throughout the several views.

In the drawing—

Fig. I is a perspective view of a preferred form of the device of the invention.

Fig. II is a left side elevational view thereof, a part being broken away.

Fig. III is a sectional front elevational view taken as indicated by the line III—III of Fig. II.

Fig. IV is an enlarged view showing a measuring scale together with a line .026" in width, as they are visible by means of the device of the invention; and, Fig. V is a diagram illustrating a method whereby dimensions to .001 of unit of mensuration may be definitely and accurately determined with a scale graduated to .005 of such unit of mensuration.

Referring to the drawing in detail, the base of the instrument is in the form of a stand, having feet 1 and 2 connected by a crossbar 3. The crossbar 3 is received in a groove in the bottom of a body 4, which may be die cast or otherwise formed of metal or synthetic plastic material, the crossbar being fastened in the groove by means of screws 5 and 6. The planes of the left and top sides of the body are perpendicular to each other, and the bottom and right sides of the body are joined by a flat surface 7 slanting upwardly and to the right at an angle of forty-five degrees with respect to the planes of the sides.

Formed in the body 4 and extending horizontally from left to right is a passage 8 which opens at its right end into a larger vertical passage 9, the axes of the passages 8 and 9 intersecting and being perpendicular to each other. The larger passage 9 has a widened, undercut mouth 10 at its upper end, and secured, by means of an expansible retaining ring 11, in the undercut portion of the mouth 10 is a magnifying lens 12, the axis of the lens being substantially coincident with the axis of the passage 9.

Lying against the slanting surface 7 and intersecting the axis of the lens 12 at a forty-five degree angle is a mirror 13, the upper left reflecting surface of which is very thinly coated with a reflecting material, such as silver or aluminum. This coating is so thin that it is transparent to light from below, however it also reflects a substantial part of light received from the passage 8. The mirror 13 is held in place by a bezel 14, which in turn is fastened to the body 4 by screws 15 and 16. The opening 17 in the bezel 14 permits objects lying between the feet 1 and 2 to be viewed through the lens 12 and mirror 13.

Extending across the lower end of the left side of the body 4 is a rabbet 18 in which the left end of the passage 8 terminates, and cemented in the rabbet 18 is a plate 19 of glass or other transparent material, the outer side of which is frosted and the inner side of which is marked with a scale 20 such as is shown in enlarged dimensions in Fig. IV.

The scale 20 comprises a series of graduations 21 including a zero graduation 22 and a series of designating numerals 23. These graduations may have any desired arrangement or spacing and may represent millimeters, gauge numbers, degrees or other units of measurement as well as fractions of inches. In the present embodiment these graduations represent multiples of five-thousandths of an inch, and, for a reason which will later become clear, the width of each graduation is two-thousandths so that the clear space between two adjacent graduations is three-thousandths of an inch. The scale 20 preferably is produced as a photographic negative, with the figures and graduations transparent, so that when it is viewed by means of the lens 12 and mirror 13, the translucent frosted surface of the plate 19 shining through the transparent figures and graduations on the thinly coated mirror imparts a brilliant appearance to the scale. The slight diminution of light from below the mirror as the light is transmitted through the reflecting surface emphasizes the contrast between the scale indicia and the field.

Although the scale is visible under ordinary room lighting conditions, its brilliancy is enhanced if the device be used with its left side facing the direction from which the room is principally lighted. An arrow labeled "Light" and pointing to the left is inscribed upon the top of the body 4 to instruct the user that the left side of the instrument should face the light.

The perpendicular distance from any point on the scale 20 to a point on the mirror 13 is the same as the distance from that point on the mirror to the plane of the flat bottoms of the feet 1 and 2. Hence, if the instrument be standing upon a flat surface, the scale 20 as viewed through the lens 12 appears to lie upon the flat surface that supports the instrument, the scale and objects at the surface upon which the instrument stands being magnified to the same extent.

In use, the object to be measured is placed between the bottoms of the feet of the instrument, then if, for example, a space on an object, which has a width of exactly twenty-five thousandths, is to be measured the instrument is shifted so that the left-hand edge of the image of the zero graduation 22 is in alignment with one edge of the space. The left-hand edge of the fifth graduation 21 then indicates the width of this space since each graduation represents five-thousandths of an inch. Thirty-thousandths of an inch is directly indicated by the left-hand edge of the next adjacent, that is the sixth, graduation 21, and so on; however, it is an object of the invention to measure distances, within the capacity of the instrument, to one-thousandths of an inch. This is readily accomplished. If, for example, the aforementioned spaced is thirty-one thousandths of an inch in width and the left-hand edge of the zero graduation 22 is brought into coincidence with the one edge of the space (Fig. V), then the center of the aforementioned sixth graduation indicates thirty-one thousandths of an inch since, as previously mentioned, each graduation has a width of two-thousandths of an inch. Thirty-two thousandths of an inch is thus indicated by the right-hand edge of the sixth graduation 21. A dimension of thirty-three thousandths is ascertained by placing the right-hand edge of the zero graduation 22 in alignment with the edge of the space and then the left-hand edge of the next adjacent or seventh graduation indicates this distance; and thirty-four thousandths is indicated when the right-hand edge of the zero graduation is in alignment with one edge of the space by the center of this graduation, as is clearly shown in Fig. V.

From the aforegoing it should be obvious that dimensions from .036" to .039" can be similarly ascertained; it should also be obvious that this method of definitely determining a spaced dimension to thousandths of a unit of mensuration with a scale graduated to five-thousandths of a unit of mensuration can be applied to instruments in which the scale has a considerable length such as described in copending application Serial No. 298,069. The instrument may be used for direct measurement of printed or etched lines on surfaces, for thread counts in fine fabrics, for determining variations from uniformity and prescribed dimensions of small objects or markings, or it may be used to determine the distance apart of divider points which have been applied to objects or markings that cannot be more conveniently measured directly.

Objects viewed with the aid of the above described instrument are seen right side up and their details are not obscured by the scale or by unusual lighting or glare. The scale and the object being at the same distance from the lens, they are equally magnified and there is no parallax, notwithstanding the fact that the object and scale may be seen from any position in a relatively wide cone of vision. The instrument can be used with facility by unskilled persons. In lightness, compactness and inexpensiveness it is greatly superior to cumbersome and costly measuring microscopes and telescopes.

The embodiment of the invention herein shown and described is to be regarded as illustrative only, and it is to be understood that the invention is susceptible to variation, modification and change within the spirit and scope of the subjoined claims.

Having described the invention, I claim:

1. In a device of the class described, in combination, an instrument body, a magnifying lens mounted on said body, a flat translucent scale mounted on said body with its plane parallel to the axis of said lens, and a flat transparent mirror mounted on said body, the plane of said mirror lying at an angle of forty-five degrees to the plane of said translucent scale and intersecting the axis of said lens at an angle of forty-five degrees, the focal length of said magnifying lens and the distances from said translucent scale to said mirror and from said mirror to said lens being such that an uninverted magnified virtual image of said translucent scale appears when said scale is viewed through said lens via said mirror there being openings in said body for passage of light through said translucent screen to said mirror and from said mirror through said lens and for passage of light through said mirror and said lens, said translucent scale consisting of a glass plate frosted on the side remote from said mirror and having transparent indicia on the side toward said mirror.

2. In a device of the class described, in combination, an instrument body, a magnifying lens mounted on said body, a flat translucent scale mounted on said body with its plane parallel to the axis of said lens, and a flat transparent mirror mounted on said body, the plane of said mirror lying at an angle of forty-five degrees to the plane of said translucent scale and intersecting the axis of said lens at an angle of forty-five degrees, the focal length of said magnifying lens and the distances from said translucent scale to said mirror and from said mirror to said lens being such that an uninverted magnified virtual image of said translucent scale appears when said scale is viewed through said lens via said mirror, there being openings in said body for passage of light through said translucent screen to said mirror and from said mirror through said lens and for passage of light through said mirror and said lens.

3. In a device of the class described, in combination, an instrument body, a plane translucent scale mounted on said body, a magnifying lens mounted on said body, the axis of said lens being parallel to the plane of said scale, a plane transparent mirror mounted on said body with the plane of said mirror lying at an angle of forty-five degrees to the plane of said scale and intersecting the axis of said lens at an angle of forty-five degrees, there being open spaces between said mirror and said scale and said mirror and said lens whereby an object viewed through said lens and transparent mirror appears together with a reflected image of said scale, and means for supporting said body upon surfaces bearing measurable objects with said mirror equally distant from such surfaces and said scale.

4. In a device of the class described, in combination, an instrument body, a plane translucent scale mounted on said body, a magnifying lens mounted on said body, the axis of said lens being parallel to the plane of said scale, a plane transparent mirror mounted on said body with the plane of said mirror lying at an angle of forty-five degrees to the plane of said scale and intersecting the axis of said lens at an angle of forty-five degrees, there being open spaces between said mirror and said scale and between said mirror and said lens whereby an object viewed through said lens and transparent mirror appears together with a reflected image of said scale, and means for spacing said mirror from a supporting surface at a distance equal to the distance of said mirror from said scale.

5. In a device of the class described, in combination, an instrument body, a plane translucent scale mounted on said body, a magnifying lens mounted on said body, the axis of said lens being parallel to the plane of said scale, and a plane transparent mirror mounted on said body with the plane of said mirror lying at an angle of forty-five degrees to the plane of said scale and intersecting the axis of said lens at an angle of forty-five degrees, the focal length of said magnifying lens and the distances from said translucent scale to said mirror and from said mirror to said lens being such that an uninverted magnified virtual image of said translucent scale appears when said scale is viewed through said lens via said mirror, there being open spaces between said mirror and said scale and between said mirror and said lens and an open space on the side of said mirror opposite said lens and means for supporting said lens at a distance from an object to be viewed equal to the distance from said translucent scale to said lens via said mirror, whereby an object viewed through said lens and transparent mirror appears together with a reflected image of said scale.

LAWRENCE S. WILLIAMS.